United States Patent Office 3,551,152
Patented Dec. 29, 1970

3,551,152
ANTISTATIC PHOTOGRAPHIC FILM
E. Scudder Mackey and Karl Pechmann, Binghamton, N.Y., and Robert E. Leary, Sommerville, N.J., assignors to GAF Corporation, New York, N.Y., a corporation of Delaware
No Drawing. Filed June 17, 1968, Ser. No. 739,591
Int. Cl. G03c 1/82
U.S. Cl. 96—85                8 Claims

ABSTRACT OF THE DISCLOSURE

Photographic film comprising a base support such as cellulose triacetate having thereon at least one other layer is improved by adding to the base support and/or one or more of the layers thereon a sufficient amount of the reaction product of glycidol and an ethoxylated linear aliphatic alcohol to minimize substantially the accumulation of static electrical charges on the film. Best results are obtained when the antistatic agent is added to the outermost layer of the film.

---

This invention relates to photographic film which is resistant to the accumulation of static electrical charges, and, more particularly, to photographic film comprising a base support having thereon at least one layer, and further comprising a sufficient amount of the reaction product of glycidol and an ethoxylated linear aliphatic alcohol to minimize substantially the accumulation of static electrical charges on the film.

Considerable difficulty is encountered during the manufacturing and use of photographic film because of the accumulation of electrical charges thereon, produced by frictional contact of the film with rollers or other parts of the machine through which it passes, by slitting or unwinding the film, by contact of the film with similar surfaces, by handling the film, and by other causes well known to those experienced in making and using such films. Such charges can also accumulate on continuous film such as motion picture film when transported rapidly through a camera. Such charges which occur in film prior to development manifest themselves after processing by formation of irregular streaks, patterns or lines in the film caused by lightning-like exposures of the emulsion at such portions.

Long, continuous motion picture films generally have a sensitized layer in coincident contact with the surface of a base support layer. When the two layers are rapidly separated, a static charge is created at the interface. This "pick-off" static appears as circular specks on the processed film. Dewinding of motion picture film produces yet another kind of static if the edges of the film rub against the camera spool flanges. This type appears on the processed film as streaks or lines starting at the edges and continuing in one or more paths toward the center of the film.

Previous attempts to overcome static in photographic films have, for the most part, utilized conducting or hygroscopic materials in the surface of the film to increase electrical conductivity and prevent the formation of static electrical charges. Such methods have not proven wholly satisfactory, particularly under conditions of low humidity, where the static problem is most acute. Further, some other materials proposed as antistatic agents are incompatible with the other ingredients used in the film, or have adverse effects on the photographic emulsion.

It is an object of this invention to provide photographic film which is highly resistant to the accumulation of static electrical charges thereon.

Another object of the invention is to provide an antistatic material particularly suitable for use in lengthy, continuous photographic film which is subject to continuous photographic film which is subject to continuous frictional contact with objects such as winding devices.

Still another object of the invention is to provide an antistatic agent which is compatible with other ingredients used in the film, and has no adverse effects on the photographic emulsion.

Another object of the invention is to provide an antistatic agent which can be added to a silver halide emulsion layer, a gelatin surface layer, a subbing layer, a curl-preventing layer, and/or the base support of a photographic film comprising a base support having such layers thereon.

Accordingly, the invention provides photographic film comprising a base support having thereon at least one other layer, said film comprising a sufficient amount of at least one reaction product of glycidol and at least one ethoxylated linear aliphatic alcohol to minimize substantially the accumulation of static electrical charges thereon.

The anti-static agents of the invention can be represented by the following general formula:

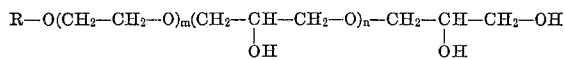

wherein R is a mixture of aliphatic hydrocarbons containing from 12 to 14 carbon atoms, $m$ is a number within the range of 3.0 to 4.0, and $n$ is a number within the range of 0 to 10.0. Specific examples of such anti-static agents are:

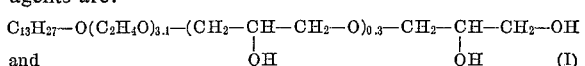

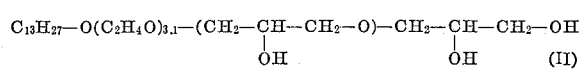

As stated above, the anti-static agents of this invention are prepared by reacting glycidol with an ethoxylated linear aliphatic alcohol. Compound I, which is shown above, is prepared in the following manner. 343 grams (1.0 mol) of the condensation product of a mixture of dodecanol and tetradecanol with 3.1 moles of ethylene oxide together with 1 gram of powdered potassium hydroxide were placed in a 1 liter, 4-neck flask equipped with an agitator, a thermometer, and a nitrogen inlet tube. The mixture was heated with agitation to 150° C. while purging the system with nitrogen to remove all traces of water. Then 96 grams (1.2 mol) of glycidol was added during a period of 1 to 1½ hours at a temperature of 145° to 155° C. After the addition of glycidol was completed, the reaction was maintained at 150° C. for about 1 hour, cooled to 90° C., then neutralized to a pH of 6.5 with phosphoric acid.

The film of this invention comprises a base support having thereon at least one other layer. The base support can be paper, plastic coated paper, or a synthetic plastic such as cellulose triacetate, a polyester, or a polyolefin such as polyethylene. The anti-static agent of the invention can be applied directly to the base support, as, for example, an anti-static backwashing solution for application to a photographic film support such as cellulose acetate or polyester prior to applying a light-sensitive emulsion to the other side of the support. Alternatively, the anti-static agent could be added to a silver halide emulsion layer, a gelatin surface layer, or as the component of a subbing solution or layer used to provide better adhesion between the base support and emulsion layers applied thereover. However, best results are obtained when the anti-static agent is added to the outermost layer on at least one side of the film. Where added to a silver halide emulsion layer, the anti-static agents of the invention facilitate spreading the gelatin surface layer over the wet, chilled silver halide emulsion when both layers are applied in the same coating step. For example, the addition of 2.5 cc. of a 10% solution of either Compound I or Compound II to 1 kilo of emulsion increases the coating speed at which a thin gelatin surface solution can be applied to a wet, chilled emulsion layer from less than 50 ft./minute to greater than 110 ft./minute. The anti-static agents of this invention are suitable for use with color films as well as with black and white films.

The anti-static agents of this invention should be present in the photographic film in an amount sufficient to minimize substantially the accumulation of static electrical charges thereon. Specifically, these agents should be present in amounts of from about 3 to about 200 grams per kilogram of gelatin.

The following examples show that photographic film comprising the anti-static agents of the invention are quite resistant to the accumulation of static electrical charges thereon.

EXAMPLE I 20 photographic film strips were prepared by applying to a polyester film base support a coating of a gelatin-containing, curl-preventing layer comprising antihalation dyes, a hardening agent, and a spreading agent. Compound I above was added to the curl-preventing layer on ten of the film strips at a concentration of 800 cc. of a 10% methanol solution per kilogram of gelatin. The other ten film strips had a control curl-preventing layer thereon which contained no anti-static agent.

The opposite sides of each base support were then coated with a gelatin-silver halide emulsion of the type used for a black and white portrait film. After drying, the coatings were cut into strips 15/16 inch wide and 10 inches long. After conditioning at 20% relative humidity and 70° F., all of the strips were rubbed in total darkness on the curl-preventing layer side with a nylon pad to generate static electricity in the film. The film strips were processed together in the usual manner, which included development, fixing, washing and drying. They were then examined for static discharge marks which can readily be recognized by the black streaks, specks, lines or other patterns in the otherwise clear emulsion.

Of the ten strips containing Compound I, none showed static markings; all of the ten control strips with no anti-static agent showed static markings ranging in intensity from light to heavy.

EXAMPLE II

A second set of twenty strips (ten comprising Compound I in the curl-preventing layer thereon, ten without) was rubbed in total darkness with the fingers instead of nylon, after conditioning at a relative humidity of 10% and a temperature of 72° F. All of the control strips showed very heavy static markings; none of the strips bearing the coating containing Compound I showed any markings whatsoever.

Surface resistivity measurements on the curl-preventing layer gave the following results:

| Coating | Surface resistivity, $10^5$ megohms | |
|---|---|---|
| | 20% R.H.: 70° F. | 41% R.H.: 69° F. |
| Control | 1,000 | 100 |
| With 80 g. compound I per 1 kilogram NC gelatin | 450 | 15 |

Note.—R.H.=Relative Humidity.

EXAMPLE III

Another set of twenty strips was prepared and tested as in Examples I and II, but the curl-preventing layer contained .08 cc. of a 10% solution of Compound II per kilogram of gelatin instead of Compound I. Nylon rub tests showed two strips with light static marks; eight with none. A signfiicant decrease in static markings was observed in the finger-rub test.

EXAMPLE IV

Coatings were made on both sides of a cellulose acetate support of an industrial X-ray film emulsion containing the usual adjuvants, and over the emulsion layers, gelatin anti-abrasion layers containing a hardener for the gelatin, a spreading agent, and a matte agent.

A second such film was coated, but to the gelatin surface solution before coating was added 1750 cc. of a 10% solution of Compound I per kilogram of gelatin. In the finger-rub tests, none of the test coating strips showed static markings, while static markings were found on the control strips. Neither the test nor the control strips showed static markings in the nylon rub test.

EXAMPLE V

Industrial X-ray film coatings were made and evaluated as in Example IV, but instead of Compound I, 1250 cc. of Compound II was added. None of the strips from the coating containing Compound II in the surface layer showed static markings in either the finger rub or the nylon rub tests; strips bearing the control coating showed such markings following the finger rub test.

Surface resistivity measurements of the coatings of Examples IV and V are as follows:

| Additive, cc. per kilogram of surface gelatin | Surface resistivity, $10^5$ megohms | |
|---|---|---|
| | 20% R.H.: 70° F. | 41% R.H.: 69° F. |
| None (control) | 400 | 30 |
| Compound I, 1,750 | 4.0 | 1.3 |
| Compound II, 1,250 | 45 | 6.0 |

EXAMPLE VI

Both sides of a cellulose acetate support were coated with a layer of silver halide medical X-ray emulsion containing the usual adjuvants, and, thereover, with an anti-abrasion layer of 2% gelatin containing a hardener for the geltin, a matte agent, and a spreading agent.

A second coating was made, but to the gelatin surface solution before coating was added a 10% solution in methanol of Compound I at a concentration of 180 cc. per kilo of dry gelatin.

Finger rub and nylon rub tests were conducted at 20% relative humidity and 75° F. No static showed on the strips from the coating containing Compound I in the surface. However, static marks were found on the strips containing the control coatings in both tests.

EXAMPLE VII

The coatings of Example VI were tested using Compound II in place of Compound I. The results of the finger rub and nylon rub tests were the same as in Example VI.

Resistivity measurements of these coatings were:

| Additive, cc. per kilo surface gelatin | Surface resistivity, $10^5$ megohms | |
|---|---|---|
| | 18% R.H.: 75° F. | 46% R.H.: 76° F. |
| Compound I, 1,800 | 30 | 2.0 |
| Compound II, 1,800 | 15 | 2.0 |
| None (control) | 1,000 | 45 |

Various modifications and variations of this invention will be obvious to persons skilled in the art, but it should be understood that such modifications are included within the spirit and scope of the invention as defined by the appended claims.

We claim:
1. Photographic light-sensitive silver halide film comprising a base support having thereon at least one other layer, said film comprising a sufficient amount of at least one reaction product of glycidol and at least one ethoxylated linear aliphatic alcohol to minimize substantially the accumulation of static electrical charges thereon.

2. The film of claim 1, wherein said reaction product has the general formula:

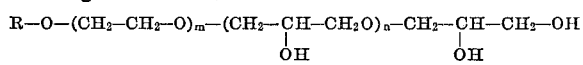

wherein R is a mixture of aliphatic hydrocarbons containing from 12 to 14 carbon atoms, $m$ is a number in the range 3.0 to 4.0, and $n$ is a number in the range 0 to 10.0.

3. The film of claim 2, wherein said reaction product is selected from

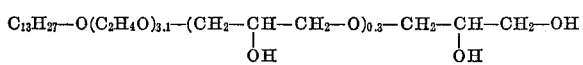

and

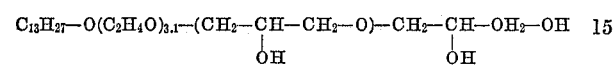

4. The film of claim 1, wherein said film is selected from the group consisting of paper, plastic coated paper, thermosetting plastic, and thermoplastic materials.

5. The film of claim 1, wherein said reaction product is present in a gelatin-containing curl-preventing layer on said base support.

6. The film of claim 1, wherein said reaction product is applied to said base support as a component of a back-washing solution.

7. The film of claim 5, wherein said reaction product is present in an amount of from 3 to about 200 grams per kilogram of gelatin.

8. The film of claim 1, wherein said reaction product is in the outermost layer on at least one side of the film.

References Cited

UNITED STATES PATENTS

| | | | |
|---|---|---|---|
| 2,831,766 | 4/1958 | Knox | 96—114.5 |
| 2,995,444 | 8/1961 | Dersch | 96—107 |
| 3,442,654 | 5/1969 | Eiseman et al. | 96—109 |

FOREIGN PATENTS

| | | | |
|---|---|---|---|
| 602,795 | 8/1960 | Canada | 96—87 |

RONALD H. SMITH, Primary Examiner

U.S. Cl. X.R.

96—87, 114.2, 114